US008280053B1

(12) United States Patent
Giraud et al.

(10) Patent No.: US 8,280,053 B1
(45) Date of Patent: Oct. 2, 2012

(54) AUTHENTICATION IN A RADIOTELEPHONY NETWORK

(75) Inventors: Jean-Luc Giraud, Aubagne (FR); Nathalie Boulet, La Destrousse (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 09/507,688

(22) Filed: Feb. 22, 2000

(51) Int. Cl.
*H04L 9/00* (2006.01)
(52) U.S. Cl. .......................... 380/247; 380/248; 380/249
(58) Field of Classification Search .................... 379/58; 455/432, 411; 380/21, 270, 23, 49, 44, 45, 380/247–249; 713/168, 159, 172
See application file for complete search history.

(56) References Cited

U.S. PATENT DOCUMENTS

| | | | | |
|---|---|---|---|---|
| 4,850,017 A * | 7/1989 | Matyas et al. | ................ | 380/280 |
| 5,216,715 A * | 6/1993 | Markwitz | ..................... | 713/171 |
| 5,282,250 A * | 1/1994 | Dent et al. | ..................... | 380/247 |
| 5,303,285 A * | 4/1994 | Kerihuel et al. | ............. | 455/461 |
| 5,371,794 A * | 12/1994 | Diffie et al. | ................... | 713/156 |
| 5,390,245 A * | 2/1995 | Dent et al. | ..................... | 380/247 |
| 5,446,796 A * | 8/1995 | Ishiguro et al. | ................. | 705/66 |
| 5,557,654 A * | 9/1996 | Maenpaa | ..................... | 455/411 |
| 5,596,641 A * | 1/1997 | Ohashi et al. | ................. | 380/248 |
| 5,889,865 A * | 3/1999 | Vanstone et al. | ............. | 713/171 |
| 5,991,407 A * | 11/1999 | Murto | ......................... | 380/248 |
| 6,081,601 A * | 6/2000 | Raivisto | ........................ | 380/270 |
| RE36,946 E * | 11/2000 | Diffie et al. | ................... | 380/278 |
| 6,236,852 B1 * | 5/2001 | Veerasamy et al. | ............ | 455/411 |
| 6,373,946 B1 * | 4/2002 | Johnston | ....................... | 380/211 |
| 6,408,175 B1 * | 6/2002 | Park | ............................ | 455/411 |
| 6,453,416 B1 * | 9/2002 | Epstein | ......................... | 713/170 |
| 6,553,493 B1 * | 4/2003 | Okumura et al. | ............. | 713/170 |
| 6,574,730 B1 * | 6/2003 | Bissell et al. | .................. | 713/168 |
| 6,584,310 B1 * | 6/2003 | Berenzweig | ............... | 455/432.1 |
| 6,690,798 B1 * | 2/2004 | Dent | ............................. | 380/248 |
| 6,711,400 B1 * | 3/2004 | Aura | ............................. | 455/411 |
| 6,892,306 B1 * | 5/2005 | En-Seung et al. | ............ | 713/193 |

(Continued)

FOREIGN PATENT DOCUMENTS

EP    0 447 380 A    9/1991

(Continued)

OTHER PUBLICATIONS

Alfred J. Menezes, Paul C. Van Oorschot, Scott A. Vanstone; Handbook of Applied Cryptography; 1997 by CRC Press LLC; pp. 24-25 and 432-434.*

(Continued)

*Primary Examiner* — Carl Colin
*Assistant Examiner* — Catherine Thiaw
(74) *Attorney, Agent, or Firm* — Buchanan Ingersoll & Rooney PC

(57) ABSTRACT

A method which improves the security of the authentication between two entities in a telecommunication network, and particularly between a mobile terminal and the fixed network, notably visitor location and nominal recorders and an authentication center, in a cellular radiotelephony network. Prior to a first authentication of the terminal, and more precisely of the SIM card therein, by the fixed network, a second authentication is based on an algorithm in which there are entered a random number produced and transmitted by the fixed network and a key different from the key for the first authentication. A transmitted signature and a signature result are produced by the fixed network and the terminal, and compared in the terminal in order to enable the first authentication in the event of equality.

17 Claims, 2 Drawing Sheets

U.S. PATENT DOCUMENTS

| | | | |
|---|---|---|---|
| 6,934,391 B1 * | 8/2005 | Linkola et al. | 380/247 |
| 7,324,645 B1 * | 1/2008 | Juopperi et al. | 380/247 |
| 8,019,991 B1 * | 9/2011 | Moles et al. | 713/160 |
| 2001/0021252 A1 * | 9/2001 | Carter et al. | 380/247 |

FOREIGN PATENT DOCUMENTS

| | | |
|---|---|---|
| EP | 0 506 637 A | 9/1992 |
| EP | 506637 A2 * | 9/1992 |
| EP | 0 651 533 A | 3/1995 |
| WO | WO 98 26538 A | 6/1998 |

OTHER PUBLICATIONS

Alfred J. Menezes, Paul C. Van Oorschot, Scott A. Vanstone; Handbook of Applied Cryptography; 1997 by CRC Press LLC; pp. 24-25, 387-388, 399, and 432-434.*

Lin, Yi-Bing, "Adaptive Algorithms for Reducing PCS Network Authentication Traffic." IEEE Transactions on Vehicular Technology, vol. 46, No. 3, Aug. 1997, pp. 588-596.

* cited by examiner

AUTHENTICATION IN A RADIOTELEPHONY NETWORK

This disclosure is based upon, and claims priority from, French Application No. 99 02276, filed Feb. 22, 1999, the contents of which are incorporated herein by reference.

BACKGROUND OF THE INVENTION

The present invention relates to a method of authentication between a mobile radiotelephony terminal and a routing subsystem, often referred to as a fixed network, in a digital cellular radiotelephony network. More particularly, the invention improves authentication through the radio interface between a microprocessor card or module, referred to as a SIM (Subscriber Identity Module) chip card, removable from the terminal, and an authentication center for the radiotelephony network.

A digital cellular radiotelephony network RR of the GSM type, to which reference will be made below by way of example, principally comprises several mobile radiotelephony terminals MS and a fixed network proper in which notably signalling, control, data and voice messages circulate, as shown schematically in FIG. 1.

In the network RR shown in FIG. 1 there are depicted notably main entities through which data intended for the SIM card of a mobile terminal MS situated in a location area at one moment pass. These entities are a mobile service switch MSC connected to at least one telephone switch CAA with self-contained routing in the switched telephone network RTC and managing communications for visiting mobile terminals, amongst which is the terminal MS, which are situated at a given moment in the respective location area served by the switch MSC. A visitor location recorder VLR is connected to the switch MSC and contains characteristics, such as the identity and subscription profile of the mobile terminals, i.e. the SIM cards therein, situated in the location area. A base station controller BSC connected to the switch MSC manages notably the allocation of channels to the mobile terminals, the base station power and mobile terminal intercell transfers. A base station BTS connected to the controller BSC covers the radio cell where the terminal MS is situated at a given moment.

The radiotelephony network RR also comprises a nominal location recorder HLR cooperating with an authentication center AUC and connected to the switches of the mobile service through the signalling network of the radiotelephony network RR.

The recorder HLR is essentially a database, such as a recorder VLR, which contains, for each terminal MS, the international identity IMSI (International Mobile Subscriber Identity) of the SIM card of the terminal, i.e. of the subscriber possessing the SIM card, the directory number and the subscription profile of the subscriber, and the number of the recorder VLR to which the mobile terminal is attached and updated at the time of transfers between location areas.

The authentication center AUC authenticates the subscribers and participates in the confidentiality of the data passing through the radio interface IR between the terminal MS and the base station BTS to which it is attached at the given moment. It manages an authentication algorithm A3 and an algorithm A8 for determining the ciphering key, sometimes merged into a single algorithm A38, in accordance with the GSM standard, which are redundant in the SIM card of the mobile terminal MS, prior to any communication with the terminal, or when the terminal is started up or at the time of an intercell transfer. In particular, the authentication center AUC stores an authentication key Ki allocated solely to the subscriber in correspondence with the identity IMSI of the subscriber stored in the nominal location recorder HLR when the subscription is taken out by the subscriber.

It is very important to authenticate the mobile radiotelephony terminal MS in order, amongst other things, to be able to recognise the subscriber. To ensure maximum flexibility, the authentication center does not authenticate the mobile terminal MS itself but the chip card SIM which it contains. This card contains the key Ki allocated to the subscriber and proves by means of the authentication algorithm A3 that it knows the key without revealing it. The fixed network sends a random number RAND (challenge) to the card and requests the card to enter the random number and the key in the authentication algorithm for a cryptographic calculation and to return the results of it in the form of a signed response SRES (Signed RESponse) for the GSM standard. It is very difficult for an "attacker", a malevolent third party wishing to establish radiotelephony communications debited to the account of the owner of the SIM card, to predict the random number. Without knowledge of the key, the attacker cannot forge a response. The size of the random number prevents the attacker from keeping in memory all the values of the random number/response pair signed in a dictionary. The authentication procedure in the radiotelephony network thus authenticates the SIM card containing a key.

The authentication procedure briefly comprises the following steps:

first, the authentication center AUC chooses several random numbers RAND and determines on the one hand several signature responses respectively as a function of the chosen numbers RAND and the key Ki allocated to the subscriber, applied to the authentication algorithm A3, and on the other hand several ciphering keys respectively as a function of the chosen numbers RAND and the key Ki applied to the key determination algorithm A8, in order to supply triplets [random number, signature response, ciphering key] to the location recorder HLR, as soon as the subscription to the mobile radiotelephony service is taken out, and then each time the recorder HLR has exhausted its reserve of triplets, in correspondence with the identity IMSI of the SIM card of the subscriber;

each time the visitor location recorder VLR to which the SIM card is momentarily attached requests an authentication of the card, the recorder HLR chooses and supplies at least one triplet to the recorder VLR in order to transmit the random number of the chosen triplet to the SIM card through the fixed network and the mobile terminal MS;

the SIM card effects a cryptographic calculation, applying the random number transmitted and the key Ki to the authentication algorithm A3 producing the signed response SRES and returns it to the recorder VLR;

the recorder VLR compares the signed response SRES with the one contained in the chosen triplet, and in the event of equality of responses, the card is authenticated.

Though this authentication procedure enables the fixed network to authenticate the card, it does not on the other hand enable the SIM card to authenticate the fixed network. No mutual authentication is provided for.

To this drawback there is added another one consisting in being able to choose any numbers sent to the SIM card in an unlimited number.

These two drawbacks make the SIM card vulnerable to attacks by auxiliary channels such as attacks with current or by logic means, for example relating to cryptanalysis.

In the field of cryptography, several types of attack are known, recovering the value of a key serving for a cryptographic calculation.

The first and most simple of the attacks consists in recovering a random number and the result of the authentication algorithm effected with this number and entering all the possible keys and the random number in the algorithm until the recovered result is obtained. In the case of authentication in a GSM network, this attack, referred to as brute force, requires $2^{127}$, i.e. a number composed of a 1 followed by 38 zeros, cipherings on average in order to obtain the key. Although this attack does not use the card, since the calculations can be made in a microcomputer, the time which it would take is much too great: with a calculation machine effecting 10,000 calculations per second, this attack would take $5 \times 10^{26}$ years.

Attacks of a second type use faults in the design of a cryptographic algorithm. For these attacks, it is very often necessary to enter chosen messages in the algorithm and to analyze the responses. Such an attack has been reported on an algorithm, referred to as COMP128, used as an authentication and A3A8 ciphering key determination algorithm according to the GSM standard. It requires on average choosing 160,000 random numbers and recovering the corresponding results. In the current GSM context, this attack can be carried out since it suffices to recover a SIM card which will effect the cryptographic calculation on any random number, as many times as the attacker requires.

Finally, a third type of attack uses "side channels". These side channels convey information on the secret data and are generally physical quantities of the implementation of the cryptographic function. A typical example of a side channel is the energy consumption of the chip card. One attack using this channel is DPA (Differential Power Analysis) and currently requires a few thousand executions of the cryptographic algorithm with random numbers which are known but are not required to be chosen. This attack is entirely achievable provided that an attacker is in possession of a SIM card.

SUMMARY OF THE INVENTION

The invention aims to remedy the drawbacks of the authentication procedure commented on above and particularly to make the last two types of attack considerably more difficult, without modifying the hardware of the radiotelephony network and with a few software modifications in relation essentially to authentication.

To this end, an authentication method between a first entity and a second entity in a telecommunication network, comprising the steps of applying first keys stored in the first and second entities and a random number produced by the second entity and transmitted by the second entity to the first entity respectively to first identical algorithms stored in the first and second entities, and comparing, in the second entity, a response produced by the first algorithm stored in the first entity and transmitted to the second entity and a response result produced by the first algorithm stored in the second entity, is characterized by the prior steps of applying second keys stored in the first and second entities and the random number produced by the second entity and transmitted by the second entity to the first entity to second algorithms stored in the second entity and the first entity, and comparing, in the first entity, a signature produced by the second algorithm in the second entity and transmitted with the random number to the first entity and a signature result produced by the second algorithm in the first entity, the first key and the random number being applied to the first algorithm in the first entity only when the transmitted signature and the signature result are identical.

According to a preferred embodiment, the first and second entities are respectively a radiotelephony terminal and a fixed network in a radiotelephony network. The steps of applying to the second algorithms and comparing the signature and signature result constitute an authentication of the fixed network by the terminal prior to the authentication of the terminal by the fixed network comprising the steps of applying to the first algorithm and comparing the response and the response result. Thus the method of the invention adds an authentication and combines it with the authentication of the terminal, allowing the execution thereof only when the fixed network is authenticated by the terminal, which enables the terminal to be much less vulnerable to the last two types of attack mentioned above.

The random number is used for first authenticating the network, rather than the terminal, in the terminal. Then the random number is used for authenticating the terminal by means of the network. For this second authentication, it is preferable for the signature to be applied with the random number produced to the first algorithm in the second entity, and the signature transmitted with the random number to be applied to the first algorithm in the first entity. The random number and the signature can have respectively Q bits and (P−Q) bits, P being a constant integer.

The invention makes the attacks described above very difficult, or even virtually impossible. The attacker must spy on the SIM card activated on the network in order to recover valid random numbers and collect a sufficient number of random numbers in order to be able to launch an attack.

This is far from being easy: the attacker cannot be in control of the frequency of the authentications in the radiotelephony network. Knowing that the number of authentications of the SIM card in the GSM network is variable and depends on the network, this can take a significant amount of time.

A first advantage of the invention consists of the succession of two authentications, which does not make it possible to validate a random number to be recovered for a card before it is activated and recognized by the network. This prevents attacks at the points of sale where, in the current state of the art, a vendor can attack the cards which are in his stock and manufacture clones before using them when the card is activated, i.e. sold.

The invention makes the majority of cryptanalysis attacks impossible, and in particular those with a chosen random number. This is because, for the card to effect a cryptographic calculation, only certified random numbers can be used, which probably do not have the format required by the attacker.

The invention makes attacks using side channels particularly difficult to effect, since a large amount of hardware and a great deal of time are required to recover valid random numbers. The cost of the attack, both in expense and in time, makes it much less profitable and is liable to discourage many attackers.

The invention thus considerably improves the security of the authentication in radiotelephony networks. It entails only a modification of the software in the SIM cards, the first entities, and nominal recorders and authentication centers, included in the second entities, without having any impact on the infrastructure of the network. These modifications can be made gradually without disruption to the fixed network.

The method can comprise steps of incrementing a variable and disconnecting the entities each time the transmitted signature and the signature result are different in the first entity such as the terminal, and as long as the variable is less than a predetermined number, preferably programmable, and refusing to establish any access to the second entity, such as the fixed means, by the first entity whenever the variable is at least equal to a predetermined number. The step of refusing to establish any access can be concomitant with enabling use of the first entity solely internally, or inhibiting any use of the first entity.

Particularly in the context of a radiotelephony network, a means of authentication and of recording a terminal identity in the fixed network determines several triplets each comprising a random number and a signature and a response result corresponding to the random number, before the step of applying the second keys in the terminal. Before the authentications, i.e. prior to the steps of applying, a ciphering key is determined according to the random number, the signature and at least one of the first and second keys in the fixed network, which includes the authentication center. Following the authentications there is provided a step of determining a ciphering key as a function of the random number, the signature and at least one of the first and second keys in the terminal only when the response and the response result compared are identical.

According to other variants increasing still further the security of the data exchanged between the first and second entities, the second key in the second entity is a second secret key, and the second key in the first entity is a public key different from the secret second key. In a similar manner, the first key in the first entity is a first secret key, and the first key in the second entity is a public key different from the first secret key.

The invention also relates to an identity module, such as a subscriber identity card, in a first entity, such as a mobile wireless terminal, which is characterized in that it comprises means for storing at least the second algorithm and at least the second key, and means for executing at least the steps for applying to the first algorithm and comparing the signature and the signature result in accordance with the invention.

BRIEF DESCRIPTION OF THE DRAWINGS

Other characteristics and advantages of the present invention will emerge more clearly from a reading of the following description of several preferred embodiments of the invention with reference to the corresponding accompanying drawings in which.

DETAILED DESCRIPTION

Figure 1:
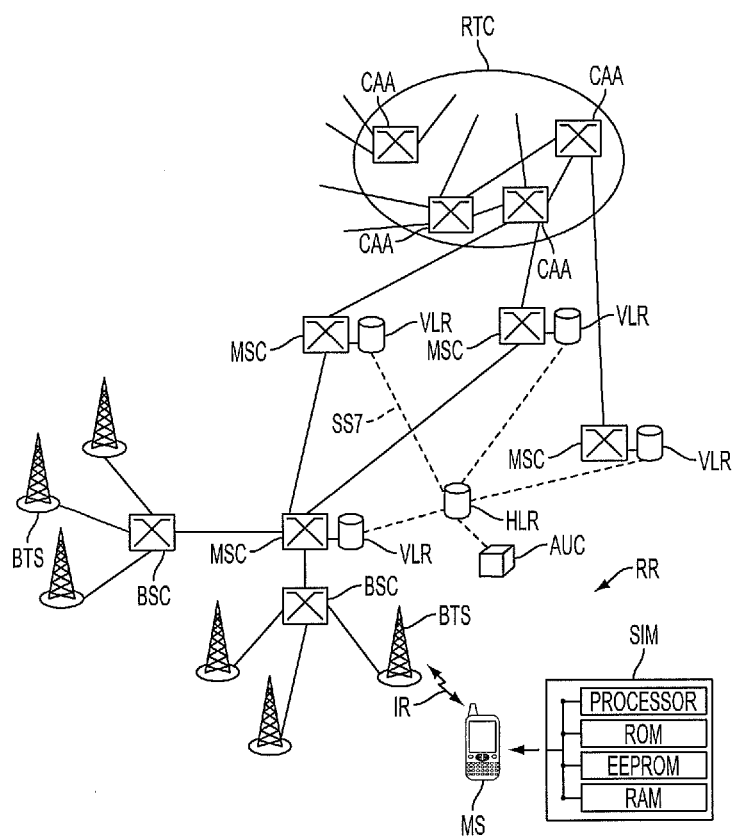
FIG. 1 is a schematic block diagram of a digital cellular radiotelephony network.

The method of the invention is described below in the context of the radio telephony network RR of the GSM type, already presented with reference to FIG. 1, which undergoes only software modifications and additions essentially in the authentication center AUC as well as in the SIM cards of the mobile terminals.

In the following description, a fixed network is considered to be the chain of entities attached to the mobile radiotelephony terminal under consideration MS from the radio interface IR, comprising the base station BTS, the station controller BSC, the switch MSC with the visitor location recorder VLR, and the pair HLR-AUC.

It should be stated that a mobile radiotelephony terminal MS of a subscriber comprises a removable microprocessor module, referred to as a SIM chip card connected to a bus of the digital circuit with a microprocessor in the terminal, the bus serving the keyboard, screen and peripheral sockets of the mobile terminal. As shown in FIG. 1, the SIM chip card contains principally a microprocessor, a ROM memory including the operating system of the card and specific application algorithms, an EEPROM non-volatile memory which contains all the characteristics related to the subscriber such as the identity IMSI, the subscription profile, the list of the called parties' numbers with their names, security data such as key and confidential code, etc., and a RAM memory serving for the processing of the data to be received from and to be transmitted to the digital circuit of the terminal. In particular, the authentication and ciphering key determination algorithms and the keys and other parameters related to these algorithms are managed and written in the ROM and EEPROM memories.

Figure 2:
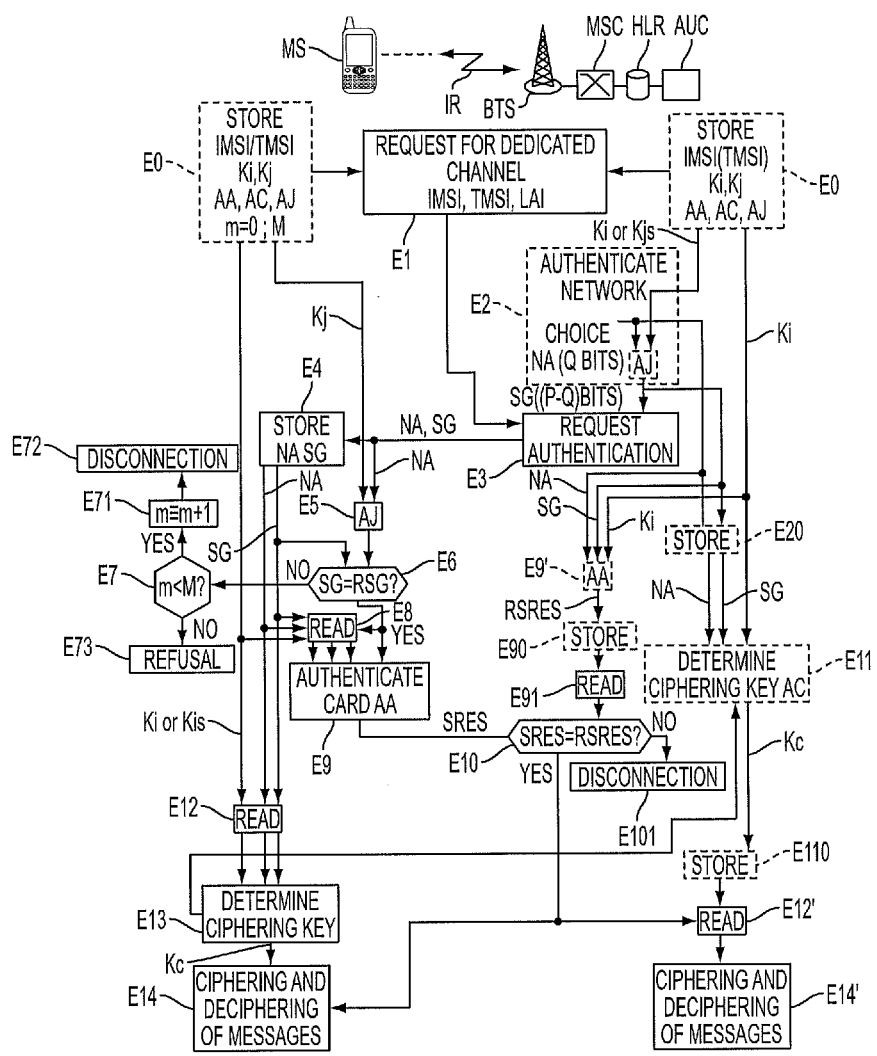
FIG. 2 shows the steps of an authentication method according to the invention.

With reference to FIG. 2, the authentication method according to the invention follows on from the SIM card of the radiotelephony terminal MS being put in communication with the sub-networks BTS, BSC, MSC and VLR included in the radiotelephony network RR and temporarily attached to the radiotelephony terminal MS, and precedes a ciphering key determination.

The method shown in FIG. 2 comprises essentially steps E0 to E14. In FIG. 2, the blocks in dotted lines relate to steps E0, E2, E9', E90, E20, E11 and E110, which are performed essentially in the fixed network, independently of any authentication request, and at least prior to the authentication request considered at step E3 according to the embodiment illustrated.

Initially, at a step E0, the mobile terminal is considered to have stored, in the ROM and EEPROM memories of its SIM card, the identity IMSI of the latter, i.e. the identity of the subscriber owning the SIM card, where applicable the temporary identity TMSI of the card allocated by the main switching center MSC, a first authentication key Ki with a first authentication algorithm AA in order to authenticate the terminal by means of the network, a ciphering key determination algorithm AC, a ciphering/deciphering algorithm, and according to the invention a second key Kj with a second authentication algorithm AJ for authenticating the network by means of the SIM card, as well as an integer variable m initially equal to 0 and an integer upper delimiter M thereof. These initial data, with the exception of the integers m and M, and algorithms are also stored at the initial step E0 in the fixed network. The keys Ki and Kj for each subscriber are stored in the authentication center AUC in correspondence with the subscriber identity IMSI, the temporary identity being allocated only by the visitor location recorder VLR connected to the switch of the mobile service MSC to which the mobile terminal MS is attached. The two authentication algorithms AA and AJ and the ciphering key determination algorithm AC are stored in the authentication center AUC, and the ciphering/deciphering algorithm is installed in the base station BTS. As will be seen subsequently, the authentication center AUC supplies triplets [(NA, SG), RSRES, Kc] to the nominal location recorder HLR.

When there is a request for access to the mobile service by the terminal, for example after the mobile terminal MS is started up, or for an updating of the location of the terminal, or prior to a telephone communication, or periodically in order to authenticate the SIM card at the request of the recorder VLR, the terminal MS exchanges signals with the attachment sub-register so as to dedicate to the terminal MS a communication channel and to declare by the terminal MS to the sub-network the terminal identity by transmitting the identity IMSI of the SIM card of the terminal to the visitor location recorder VLR, or where applicable the temporary identity TMSI with the identity of the location area LAI relating to the last communication established. These exchanges for dedicating a channel to the terminal MS are illustrated in a simplified fashion by step E1 in FIG. 2.

The following steps E2 to E8 relate to the authentication of the network by the SIM card which is added by the invention and which is essentially located partly in the authentication center AUC and the recorders HLR and VLR and partly in the ROM and EEPROM memories of the SIM card.

First, in the center AUC, a pseudo-random generator supplies several random numbers NA with Q bits. The key Kj different from the key Ki and stored in the center AUC and each random number NA with Q bits are applied to the input of the network authentication algorithm AJ in the center AUC at step E2. As a variant, the keys Kj and Ki can be identical. The algorithm AJ is for example of the DES (Data Encryption Standard) type and produces random number signatures SG with (P−Q) bits. The random numbers NA and the corresponding signatures SG are written in the recorder HLR in association with the identity IMSI of the SIM card and at least one pair [NA, SG] chosen by the recorder HLR is transmitted to the recorder VLR to which the terminal is attached at step E20.

When the visitor location recorder VLR decides to proceed with the authentication of the fixed network by means of the SIM card according to the invention, the chosen pair [NA, SG] is introduced successively into authentication request messages at step E3 transmitted respectively by the switch MSC, the controller BSC and finally the base station BTS to the mobile terminal MS through the radio interface IR. The integer P, with P>Q, is chosen so as not to modify the length of the authentication messages according to the standard in force in the radiotelephony network RR, in this case the length of the messages containing a number RAND. The integer P is typically equal to 128, i.e. a size of the pair [NA, SG] equal to 16 octets. The integer Q denoting the number of bits in the random number NA can be greater than or less than P/2; however, the integers P and Q can satisfy the equality P/2=Q.

In the SIM card of the mobile terminal MS, the random number NA and the signature SG are written in the RAM memory of the SIM card at step E4 in response to the authentication request messages transmitted by the attachment base station BTS. Immediately, at the following step E5, the random number NA and the key Kj are applied to the algorithm AJ contained in the ROM and EEPROM memories of the SIM card, in a manner similar to the unfolding of the algorithm AJ at step E2 in the authentication center AUC. The result RSG produced by the algorithm AJ is compared with the signature SG transmitted by the authentication center AUC and read at step E6.

If, at step E6, RSG is different from SG, the variable m is compared with the predetermined integer M, typically equal to approximately 10, at step E7. As long as m<M, the variable m is incremented by one unit in a counter and the SIM card does not perform the following step E9 of producing a signature response SRES each time that SG is different from RSG following an authentication request message, and consequently the dedicated signal channel is released so that the requested access to the mobile service by the terminal is not established, releasing the radio resources, as indicated at steps E71 and E72. The counter is contained in the SIM card, and the integer M is programmable so that the operator supplying the SIM card can select the integer M.

When the variable m reaches the upper delimiter M at step E7, access to the mobile service is naturally not established as before, but also any new authentication is systematically refused, as indicated at step E73. This means that the SIM card is probably under "attack" by an ill-intentioned third party for fraudulent use of the subscriber account allocated by the network to the SIM card. In this case two variants are recommended by the invention.

According to a first variant, the SIM card enables the subscriber to use the radiotelephony terminal MS solely for local commands internal to the terminal. For example, the local commands serve to consult the list of call numbers via the keypad or the voice recognition means of the terminal, without enabling the establishment of any telephone communication.

According to a second variant, the SIM card blocks any action of the subscriber by means of the keypad, and/or the voice recognition means, and switches off the terminal, i.e. the SIM card becomes "mute"; the SIM card no longer accepts any command and the terminal MS is unusable.

Returning to step E6, when the result RSG is equal to the signature SG, the random number NA and the signature SG received and the authentication key Ki are read at step E8 in order to apply them to the known authentication algorithm AA at step E9. At this stage, the authentication continues substantially as in a known SIM card. The algorithm AA supplies a signed response SRES (Signed RESponse) which is included in a message transmitted to the attachment base station BTS, which retransmits it to the recorder VLR through the base station BTS, the controller BSC and the switch MSC.

First, before the authentication request E3 and therefore before the performance of steps E3 to E9 in the SIM card, the recorders VLR and HLR have stored, for the subscriber, the number NA and the signature SG, and the authentication center AUC has applied, after step E20, at each of said random numbers NA, the random number NA, the corresponding signature SG and the first key Ki to the algorithm AA at a step E9'. The algorithm AA produces a signed response result RSRES for each pair (NA, SG). Concomitantly with step E20, the results RSRES are written in the recorder HLR at a step E90 and the pair (NA, SG) chosen by the recorder is transmitted with the corresponding result RSRES to the recorder VLR which stored them.

On reception of the signed response SRES transmitted by the mobile terminal MS after step E9, the recorder VLR reads the signed response result RSRES at step E91 and compares it with the response received SRES at step E10. If these two variables are not identical, the recorder VLR instructs the main switching center MSC to disconnect the terminal and the fixed network at step E101, preventing the terminal from pursuing its request for access to the mobile service.

In the contrary case, the authentication center AUC validates the authentication of the SIM card at step E10, which followed the authentication (step E5) of the network RR by the SIM card according to the invention, to enable the ciphering and deciphering of the messages exchanged subsequently between the mobile terminal MS and the sub-network BTS-BSC-MSC.

First, the authentication center AUC applied the pairs (NA, SG) corresponding to several random numbers NC and the key to the ciphering key determination algorithm AC at a step E11 in order to produce ciphering keys Kc, which are stored in the recorder VLR at a step E110 concomitant with steps E20 and E90. Thus several triplets [(NA, SG), RSRES, Kc] are first stored in the nominal location recorder HRL, and at least one of them is written in the recorder VLR in association with the identity IMSI/TMSI of the SIM card.

Following step E10, the switch MSC decides to switch to ciphered mode, transmitting a ciphering enable message with the key Kc, relayed by the entities BSC and BTS, to the mobile terminal MS, the key Kc being taken by the base station BTS.

Moreover, following the execution of the authentication step E9, the SIM card at step E12 reads the random number NA and SG and also the authentication key Ki in order to apply them to the ciphering algorithm AC so as to determine a ciphering key Kc at step E13.

Finally, at steps E14 and E14', the terminal MS and the subscriber line sub-network, particularly the subscriber line base station BTS which contains a ciphering and deciphering algorithm identical to the one contained in the SIM card and which stored the given key Kc, can exchange ciphered and deciphered messages with the key Kc.

In variants, the second keys Kj, or the first and second keys Ki and Kj, are read and applied respectively to the algorithms AC, in place of the first keys Ki at steps E13 and E11.

According to other variants, the key Kj allocated to the SIM card in the authentication center AUC is a secret private key Kjs, and the key Kj contained in the SIM card is a public key different from the key Kj and having a complex link with the secret key Kjs. The network authentication algorithm AJ is asymmetric and makes it possible to verify the signature SG by comparison with the result RSG at step E6, although the SIM card, and therefore any ill-intentioned person, is unaware of the secret key Kjs.

In a similar fashion, the key Ki in the SIM card is replaced by a secret key Kis, and the key Ki in the authentication center AUC is a public key, the card authentication algorithm AA then being asymmetric.

Although the invention has been described according to preferred embodiments with reference to a radiotelephony network between a mobile radiotelephony terminal and the fixed network of the radiotelephony network, the authentication method of the invention can be implemented in a telecommunication network relative to any two entities which each have a need to authenticate the other one, each entity being able to be a set of predetermined linked entities.

What is claimed is:

1. An authentication method between a first entity and a second entity in a telecommunication network, comprising steps of:
   storing first keys allocated to said second entity in non-volatile storage in the first and second entities for use in a plurality of authentication sessions between the first and the second entities, and
   for each of the plurality of authentication sessions, performing the following operations:
      applying the first keys and a random number produced by the first entity and transmitted by the first entity to the second entity to first algorithms stored in the first entity and the second entity;
      comparing, in the second entity, a signature produced by the first algorithm in the first entity and transmitted with the random number to the second entity and a signature result produced by the first algorithm in the second entity,
      applying second keys, different from said first keys and allocated to said second entity, and stored in non-volatile storage in the first and second entities, and the random number produced by the first entity and transmitted by the first entity to the second entity to second identical algorithms stored in the first and second entities, only when the transmitted signature and the signature result are identical;
      comparing, in the first entity, a response produced by the second algorithm stored in the second entity and transmitted to the first entity and a response result produced by the second algorithm stored in the first entity;
      enabling communications to take place between said first and second entities if the response transmitted by the first entity is identical to the response produced in the second entity.

2. A method according to claim 1, wherein the signature is also applied with the random number to the second algorithm in the first entity, and the signature transmitted with the random number is also applied to the second algorithm in the second entity.

3. A method according to claim 1, wherein the random number and the signature have respectively Q bits and (P−Q) bits, P being a constant integer.

4. A method according to claim 1, wherein each of the plurality of authentication sessions further comprises the following operations:
   incrementing a variable (m) and disconnecting the entities each time the transmitted signature and the signature result are different in the second entity and as long as the variable is less than a predetermined number (M); and
   refusing to establish any access to the first entity by the second entity whenever the variable (m) is at least equal to a predetermined number (M).

5. A method according to claim 4, wherein the operation of refusing to establish any access is concomitant with authorizing stand-alone use of the second entity.

6. A method according to claim 4, wherein the operation of refusing to establish any access is concomitant with inhibiting any use of the second entity.

7. A method according to claim 4, wherein the first and second entities are respectively a fixed radiotelephony network and a radiotelephony terminal.

8. A method according to claim 1, wherein the first and second entities are respectively a fixed radiotelephony network and a radiotelephony terminal.

9. A method according to claim 8, according to which an authentication and terminal identity recording means in the fixed network determines several triplets each comprising a random number and a signature and a response result corresponding to the random number, before the operation of applying the first keys in the terminal.

10. A method according to claim 9, wherein each of the plurality of authentication sessions comprises the further operation of determining a ciphering key as a function of the random number, the signature and at least one of the first and second keys in the fixed network prior to the applying operations.

11. A method according to claim 8, wherein each of the plurality of authentication sessions comprises the further operation of determining a ciphering key as a function of the random number, the signature and at least one of the first and second keys in the fixed network prior to the applying operations.

12. A method according to claim 8, wherein each of the plurality of authentication sessions comprises the further operation of determining a ciphering key as a function of the random number, the signature and at least one of the first and second keys in the terminal only when the response and the response result compared are identical.

13. A method according to claim 8, wherein the first key in the first entity is a first secret key, and the first key in the second entity is a public key different from the first secret key.

14. A method according to claim 8, wherein the second key in the second entity is a second secret key, and the second key in the first entity is a public key different from the second secret key.

15. A method according to claim 1, wherein the first key in the first entity is a first secret key, and the first key in the second entity is a public key different from the first secret key.

16. A method according to claim 1, wherein the second key in the second entity is a second secret key, and the second key in the first entity is a public key different from the second secret key.

17. An identity module in a second entity for use in performing the method of claim 1, comprising means for storing at least the first algorithm and at least the first key, and means for executing at least the operations of applying the first key and the random number to the first algorithm and comparing the signature result produced by the first algorithm to the signature transmitted with the random number.

* * * * *

UNITED STATES PATENT AND TRADEMARK OFFICE
CERTIFICATE OF CORRECTION

PATENT NO. : 8,280,053 B1  
APPLICATION NO. : 09/507688  
DATED : October 2, 2012  
INVENTOR(S) : Jean-Luc Giraud et al.

Page 1 of 1

It is certified that error appears in the above-identified patent and that said Letters Patent is hereby corrected as shown below:

Title Page, insert item -- (30) Foreign Application Priority Data: FR 99 02276 February 22, 1999 --.

Signed and Sealed this

Fifteenth Day of January, 2013

David J. Kappos  
*Director of the United States Patent and Trademark Office*